United States Patent [19]

Paul

[11] Patent Number: 5,122,033
[45] Date of Patent: Jun. 16, 1992

[54] TURBINE BLADE UNIT

[76] Inventor: Marius A. Paul, 1110 E. Elm Ave., Fullerton, Calif. 92631

[21] Appl. No.: 614,868

[22] Filed: Nov. 16, 1990

[51] Int. Cl.⁵ .............................................. F01D 5/18
[52] U.S. Cl. ................................................ 416/96 R
[58] Field of Search ............ 415/115, 116; 415/96 R, 416/97 R, 90 RA, 92, 96 A; 60/39.53, 39.55, 736

[56] References Cited

U.S. PATENT DOCUMENTS

| | | | |
|---|---|---|---|
| 2,563,269 | 8/1951 | Price | 416/90 |
| 2,575,682 | 11/1951 | Price | 60/35.6 |
| 2,647,368 | 8/1953 | Triebbnigg et al. | 60/30.05 |
| 2,970,807 | 2/1961 | Wackersberg | |
| 3,446,481 | 5/1969 | Kydd | |
| 3,446,482 | 5/1969 | Kydd | |
| 3,533,712 | 2/1966 | Kercher | 416/92 |
| 3,600,890 | 8/1971 | White | 60/39.66 |
| 3,658,439 | 4/1972 | Kydd | 416/97 |
| 3,806,275 | 8/1972 | Aspinwall | 416/97 |
| 3,844,679 | 10/1974 | Grondahl | 416/97 |
| 3,856,433 | 12/1974 | Grondahl et al. | 416/97 |
| 4,111,604 | 9/1978 | Kydd | 416/97 |
| 4,118,145 | 10/1978 | Stahl | 416/96 |
| 4,190,398 | 2/1988 | Corsmeier et al. | 415/114 |
| 4,242,045 | 12/1980 | Grondahl et al. | 416/92 |
| 4,321,010 | 3/1982 | Wilkinson et al. | 416/96 A |
| 4,338,780 | 7/1982 | Sakamoto et al. | 60/39.05 |
| 4,845,941 | 7/1989 | Paul | 60/39.06 |
| 4,845,951 | 7/1989 | Hayashi et al. | 60/488 |
| 4,946,346 | 8/1990 | Ito | 415/115 |
| 4,982,564 | 1/1991 | Hines | 60/39.53 |
| 5,003,766 | 4/1991 | Paul | 60/39.15 |

FOREIGN PATENT DOCUMENTS

| | | |
|---|---|---|
| 1246324 | 8/1967 | Fed. Rep. of Germany . |
| 924012 | 3/1947 | France . |

OTHER PUBLICATIONS

Fundamentals of gas turbines, John Wiley and Sons, W. W. Bathie, pp. 252-259.

*Primary Examiner*—John T. Kwon
*Attorney, Agent, or Firm*—Bielen, Peterson & Lampe

[57] ABSTRACT

A gas turbine blade unit for use in a blade assembly in a gas turbine engine having a combustion chamber in which fuel and air are burned to produce combustion gases, the turbine blade assembly having internal channels for mixing liquid and air within the blade unit for discharge as a vapor-air mixture into the combustion chamber.

7 Claims, 2 Drawing Sheets

TURBINE BLADE UNIT

BACKGROUND OF THE INVENTION

This invention relates to an internally cooled turbine blade for use in high temperature gas turbines. The turbine blade unit of this invention is particularly related to those designs which admit both liquid and air into the turbine blade for mixing and subsequent discharge into a combustion chamber. The construction and operation of the blade unit of this invention is, in general, similar to the blade design described in my patent entitled, Gas Turbine Engine Operating Process, U.S. Pat. No. 4,845,951, issued Jul. 11, 1989, and in particular to my application entitled, Gas Turbine Engine, Ser. No. 348,674, filed May 8, 1989.

The turbine blade unit of this application is particularly designed for use in turbine engines having an annular combustion chamber arranged around the periphery of the ends of a turbine blade assembly. In this arrangement a liquid and air mixture that is utilized to cool the blades can be discharged directly from the end of the blades into the annular combustion chamber. Preferably, the combusted and heated gases in the combustion chamber are then directed at the blades that have been cooled to drive the turbine.

The turbine blade unit of this invention is of the general type as disclosed in the earlier prior art patent of Triebbnigg, et al, entitled, "Method and Apparatus for Internally Cooling Gas Turbine Blades with Air, Fuel, and Water," U.S. Pat. No. 2,647,368, issued Aug. 4, 1953. In the Triebbnigg reference, there is described a turbine blade having passages where air and water or fuel are mixed in the root of the blade and passed linearly through the body of the blade for discharge at the end of the blade to downstream gas flow. In a preferred example where fuel is used as the liquid coolant, the discharged air-fuel mixture is subsequently combusted in an after-burner assembly.

In the preferred environment of a turbine engine with an annular combustion chamber as described in my prior patent, the liquid-air mixture, after cooling the turbine blades is discharged as a vapor-air mixture directly into the combustion chamber. When the blades are incorporated in a blade assembly on a rotor, the 15 discharge is at a high velocity that enhances the pressurization and turbulent mixing of gases in the combustion chamber for a complete and thorough combustion. It is contemplated that additional air and fuel are supplied under pressure in a controlled manner directly to the combustion chamber in order to optimize the combustion for the particular operating conditions of the turbine engine, in part depending on the type of liquid used in the air-liquid coolant mixture.

Because an optimized, substantially stoichiometric combustion of fuel in a turbine combustion chamber may generate heat that exceeds the structural limitations of uncooled turbine blades, various means have been devised to optimize cooling and therefore maximize the efficiency of operation of the turbine engine. Coolants, such as air, fuel, water or combinations of these fluids have been utilized successfully to cool turbine blades and raise the operating temperature of the combustion chamber. In general, stoichiometric combustion of typical turbine fuel will produce a temperature of approximately 4000° F. To maintain structural integrity of turbine blade materials, high temperature metal alloys such as Inconel have been developed which operate at 1800° F. and above. To optimize the thermal environment in which such blades can be operated, improved designs which capitalize on the vaporization of liquids in an air stream are desired. Since a primary use for turbine engines is in aircraft, it is economic to utilize the fuel as the desired coolant prior to combustion. In this manner the heat required to vaporize the fuel and bring it to a temperature that will not dampen efficient combustion is extracted during the process of cooling the turbine blades. This regenerative process greatly enhances the overall efficiency of the engine.

In situations where weight is not a problem, such as cogeneration, the coolant can be a non-combustible such as water, and the engine operated in a combined Brayton cycle and Rankine cycle. In the preferred embodiments, a combined liquid and air mixture is desired for the coolant because of the recuperative effect in recovering the energy necessarily required to bring the liquid-air mixture to a gaseous state for use as a motive medium to drive the turbine blade assembly that has been cooled.

In the embodiments defined in my prior application, referenced above, a liquid coolant was delivered through a center passage in the blade unit and dispersed through diagonal side passages to outer channels between the core of the blade and an outer skin that is shaped to give the blade its dynamic airfoil configuration. It has been discovered, that the zone of mixing between the blade core and the outer skin was not optimized because of the essentially laminar flow of air and fuel mixture moving rapidly through the channels. Because of the very short dwell time of the fuel and air in the channels, cooling of the turbine blade skin, the component that forms the airfoil that is exposed directly to the heated combustion gases, was impeded by the laminar flow.

The particular embodiments of my previous application, Ser. No. 348,674, utilized a central cavity that was primarily a fuel cavity wherein the liquid fuel in the cavity was forced by compressed air through diagonal passages to channels between the blade core and blade skin. The fuel dispersed into the channels was transported through the linear channels between the blade core and blade skin for discharge at the end of the blade core. The initial deployment of air into the linear blade channels reduced the effectiveness of the incoming fuel from the staged diagonal passages, apparently because of laminar conditions in the flow.

In the embodiments of this invention, a dual liquid-air path is provided. By a first path, compressed air is supplied to a central air cavity and fuel is sprayed into the cavity, directed at the wall of the cavity. Simultaneously, by a second path, fuel is sprayed into the entry of cooling channels between the blade core and the airfoil skin. Cross passages between the central cavity and the channels provide for a colliding mixture of partially vaporized liquid and air in the channels disrupting 10 laminar flow. The turbulent flow of the liquid-air mixture through the channels cools the skin and outer surface of the core before discharge into the combustion chamber. It is this turbulent cross flow that is most effective in rapidly vaporizing the liquid fuel film formed on the walls of the channels.

SUMMARY OF THE INVENTION

The internally cooled turbine blade unit of this invention is constructed with a blade core that provides the structural strength and general configuration to the blade or airfoil, and a blade skin that provides the exactly contoured, high temperature surface exposed to the combustion gases for directing the gases and rotating the turbine rotor. The basic air core design with dual path coolant system presented herein is applicable to both rotor and stator blades. In both configurations, the blade unit includes a core having a base with conduit means for admitting fuel and air into a central cavity in the blade core to cool the core and begin the vaporization process of the fuel. The fuel is preferably metered by a spray passage that directs the fuel against the wall of the cavity. The structural blade core also has a segment that is encompassed by a high temperature skin. Linear channels are formed in the core between the blade skin and the core. Additional fuel and air are directed through an entry to the channels located in the base of the blade. The channels communicate with a discharge opening at the distal end of the blade unit for discharge of a fuel-air mixture from the blade unit preferably into an annular combustion chamber that encompasses the blade assembly.

A series of cross passages connecting the central cavity in the blade core with the surface channels provides a liquid-air cross flow that intersects the channel flow resulting in substantial turbulence in the channels for enhanced cooling, particularly of the blade skin.

In the preferred embodiments of the turbine blades, each blade unit has an end construction that in unison with the other blades in the assembly forms a shroud to isolate the rotor section of the engine from the combustion section. In an assembly of blades forming either the stator guide vanes or the rotor blades, the combustion gas passages delimited by the blade airfoils, the peripheral shroud member and the blade platform, require cooling to maintain the blade material within design temperatures to preserve the blade's structural integrity. By internal cooling of each portion of the blade exposed to the motive gases, the blade assembly can be operated in an environment in which the temperature of the combustion gases is at or close to the stoichiometric temperature of the fuel.

In addition to recovering the thermal energy lost to cooling the blades by vaporizing and raising the temperature of the air vapor mixture before entry into the combustion chamber, the kinetic energy in the discharge of the mixture from the rotor blades enhances the compression of the precombustion air and fuel mixture.

DESCRIPTION OF THE PREFERRED EMBODIMENTS

Figure 1:
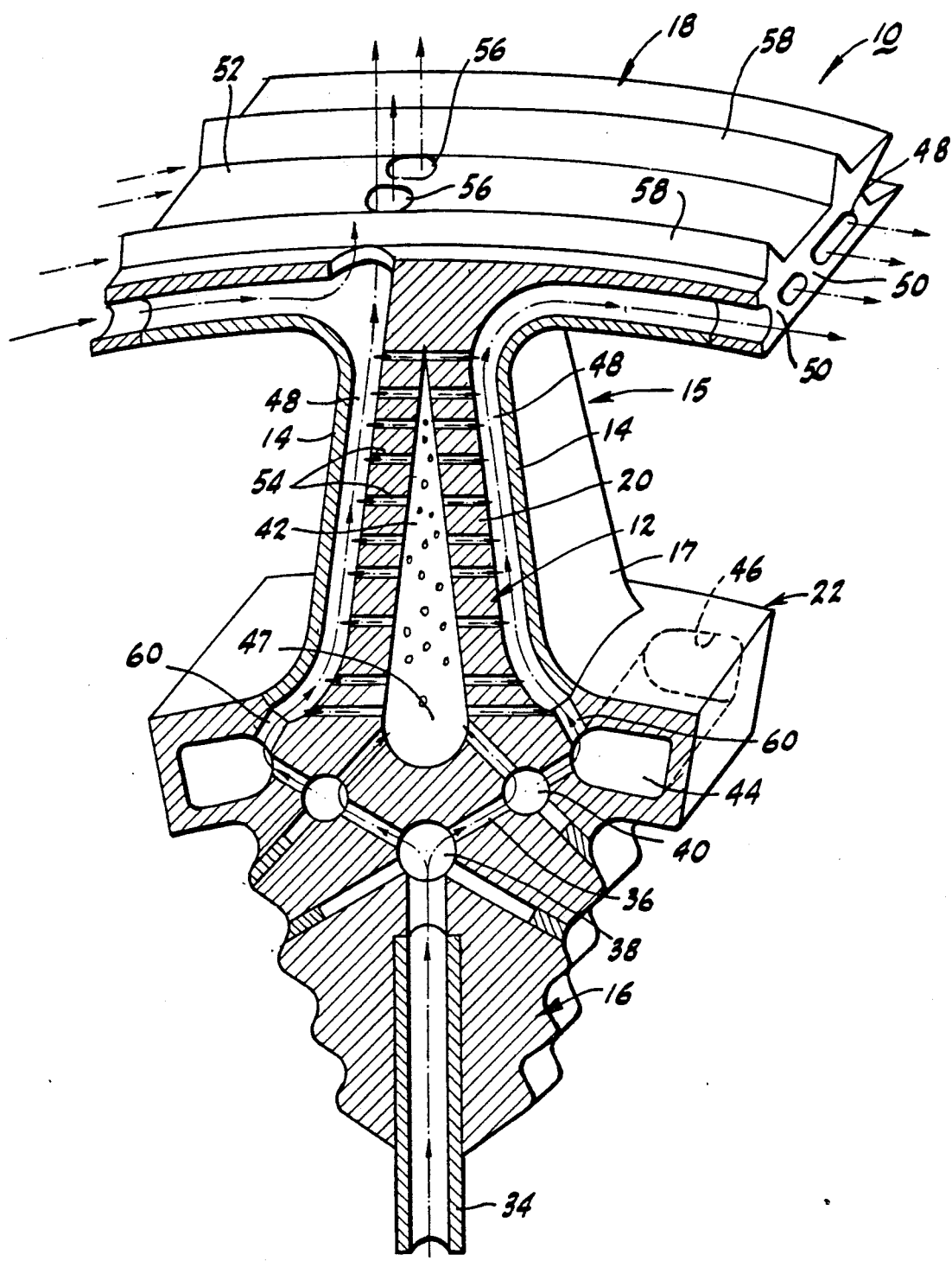
FIG. 1 is a perspective view, partially in cross section of a typical rotor blade.
Figure 2:
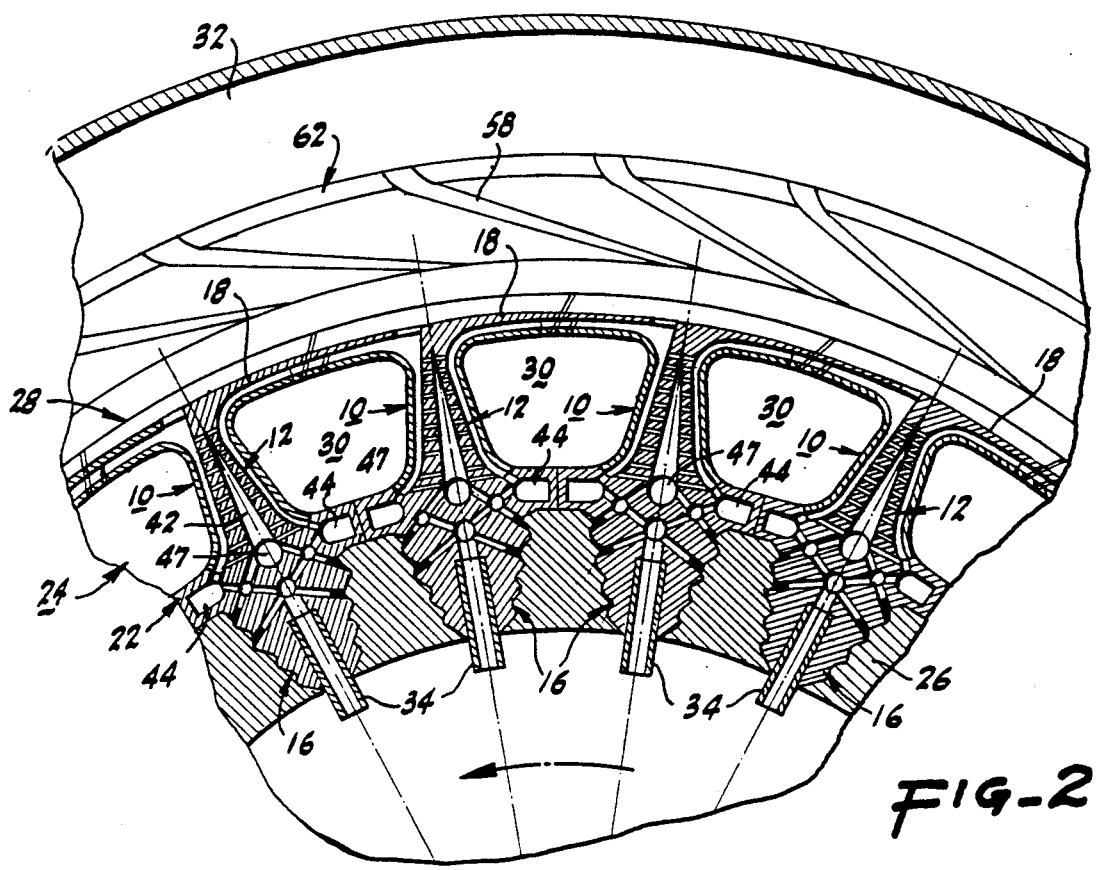
FIG. 2 is a cross sectional view of the rotor blade of FIG. 1 in a partial blade assembly with an accompanying annular combustion chamber.
Figure 3:
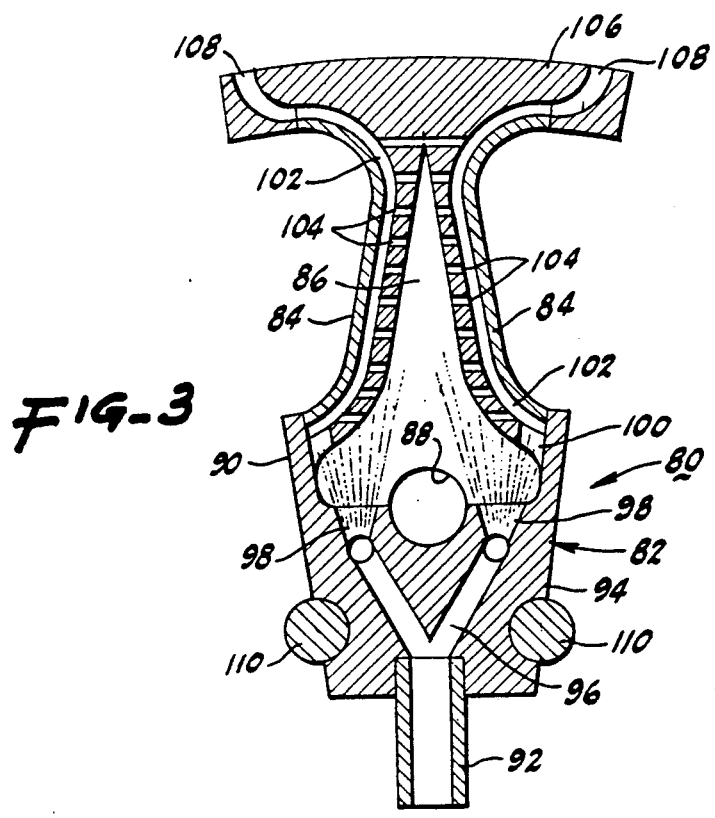
FIG. 3 is a cross sectional view of a typical stator blade.

Referring to FIG. 1, a typical blade unit, designated generally by the reference numeral 10, is shown in cross section to illustrate both the internal as well as external configuration. The blade unit of FIG. 1 is designed as a rotor blade for a rotor blade assembly as shown in FIG. 2. The blade unit of FIG. 3 is a typical blade for a stator assembly (not shown).

The blade unit 10 of FIG. 1 includes a structural core 12 with a blade skin 14 covering a portion of the core and providing the defined airfoil for rotation of the turbine rotor on passage of the combustion gases. The elongated blade core 12 has a central axis that is radially oriented when installed in a blade assembly as shown in FIG. 2. The blade core 12 has a root 16 at one end and a shroud element 18 at its opposite end. The blade skin 14 is mounted to a middle blade segment 20 of the core 12 above a base platform 22. The skin 14 is secured to the core by any suitable means, such as electron beam or laser welding. The middle segment of the core 12 generally defines the shape of the blade 15 with the blade skin 14 defining the exact configuration of the airfoil surface 17.

Each blade unit 10 is constructed such that when combined in an assembly 24 as shown in FIG. 2, each base platform 22 abuts the base platform of the neighboring blade unit to form a continuous surface over the rotor disk 26 of the turbine. In a similar manner, the shroud segment 18 of each blade unit 10 abuts the shroud segment of the neighboring blade unit to form a continuous peripheral shroud assembly 28. When assembled as shown in FIG. 2, the blade assembly forms a series of discreet passageway 30 through which the high temperature combustion gases pass to drive turbine rotor. As is apparent from the detailed consideration of the internal structure of the blade unit of FIG. 1, the entire peripheral surface of each passageway, including is cooled by the internal cooling system in each blade unit.

Referring to FIGS. 1 and 2 the blade unit includes a unique cooling system that utilizes dual, intersecting liquid-air paths for cooling the complete blade structure before the gaseous coolant mixture is discharged from the perimeter of the blade assembly. In the rotor blade unit of FIGS. 1 and 2, this discharge is a high velocity centrifugal expulsion resulting from the high speed rotation of the rotor. The discharged coolant mixture in the preferred embodiments is expelled to an annular combustion chamber 32 which is circumferentially arranged around the turbine blade assembly 24.

As shown in FIG. 1, a liquid coolant enters the blade unit 10 through a supply tube 34 connected to the end of the root 16 of the blade core 12 and is fed to internal fuel passages 36 which bifurcates the coolant supply in two stages 38 and 40 before the fuel enters inner and outer air chambers 42 and 44 in the base platform 22. The outer air chamber 44 extend to an opening 46 (in dotted line) in the front and back of the blade unit to receive compressed air in a manner similar to that disclosed in my prior application, Ser. No. 348,674. Similarly, a bottom portion 47 of the tear-shaped inner chamber 42 open to receive compressed air. The inner chamber 42 comprises a cavity with walls that extends up through the middle section of the blade core 12.

The root 16 of the blade unit 10 is most removed from the hot combustion gases and is adequately cooled by the flow of liquid coolant, which may comprise water, fuel or a combination thereof such as a water diluted methanol or liquid ammonia solution. The fuel sprays into the inner and outer air chambers 42 and 44 coating 15 the walls. In part the liquid atomized for transport by the air flow into the blade unit for subsequent cooling of the middle section 20 of the core 12 and the blade skin 14.

Cooling of the middle section 20 is accomplished by the dual path cooling system in which one path, comprising a series of channels 48 in each side of the core 12 that extend from the outer chambers 44 to the distal end of the blade unit at the shroud segment 18. These channels 48 are formed between radial ribs 50 which continuously extend around the shroud segment 18 and provide cooling conduits between the core 12 and the blade skin 14. The outer surface 74 of the blade skin receives the brunt of the high temperature combustion gases and requires effective cooling. Key to the effective cooling of the middle section 20 of the core 12 and the blade skin 14 are a series of cross passages 52 perpendicular to the axis of the blade unit 10 that connect the inner cavity 42 with the channels 48. In operation, the series of cross passages 52 direct a jet of liquid-air mixture that is partially atomized and partially vaporized at the inner surface of the blade skin 14. The jet of liquid-air mixture collides with a similar liquid-air mixture that flows through the channels 48. This impingement jet sets up a turbulent condition in the coolant flow in the channels. Turbulent flow is far more effective in promoting vaporization and heat transfer from the core and skin surfaces than is laminar flow. This dual flow system in which one flow path that is substantially axial to the blade unit collides with a flow path that is directed perpendicular to the axis of the blade unit is key to the cooling system.

In the preferred embodiment the blade unit 10 has a shroud segment 18 in which the channels 48 continue. In the outer peripheral surface 54 of the shroud segment 18 are discharge orifices 56 located between the projecting seals labyrinth 58. Each blade unit 10 cooperates with its adjacent blade unit, as shown in FIG. 2, such that a single set of discharge orifices 56 is located proximate the front or low pressure side of the core 12, with the higher pressure flow through the channels on the back side of the blades flowing to the discharge orifices on the next adjacent blade unit. The blade skin 14 continues from the middle section 20 of the core to the shroud segment 18. The surface 17 of the blade skin 14 defines the dynamic configuration of the blade 15 and as is conventionally configured as a curved tear-drop or crescent-shaped structure, tapering at its trailing edge. The construction of the cooling channels are such that the flow and cross flow of mixed liquid and air coolant cools the internal surfaces of the converging trailing blade skin as well as the thicker lead edge by appropriate circumferential orientation of the series of cross passages 52 initiating from the inner wall of the cavity 42.

By appropriate mixture can sizing of the entry orifices 60 and appropriate sizing of the cross passages 52, a rich, wet fuel and air mixture can jet into the channels to provide a liquid film over all of the internal surfaces of the channels and skin. The liquid film is transformed by vaporization to a vapor-air mixture by the time that the gaseous coolant mixture is discharged through the discharge orifices 56.

As shown in FIG. 2 the combustion chamber 32 includes a defuser structure 58 with defuser blades 60 that finally direct the centrifugally expelled coolant mixture from the turbine blades into the combustion chamber 32 in a further compressed state.

Referring to FIG. 3, a typical construction of a preferred stator blade unit 80 is shown. The stator blade unit 80 includes a blade core 82 that is coupled to a blade skin 84 in a manner similar to that for the rotor blade unit 10. The stator blade unit has a somewhat simplified internal cooling passage system which utilizes a single internal air chamber 86 supplied by an air intake orifice 88 in the base platform section 90 of the blade unit. A liquid is supplied through a supply tube 92 in the root portion 94 of the blade unit 80 to a bifurcated fuel passage 96 with discharge openings 98 for discharging a spray of liquid coolant onto the walls of the interchamber 86, and into orifices 100 leading to channels 102 between the blade core 82 and blade skin 84. A series of cross passages 104 provides for impingement jets of rich liquid coolant mixed with air from the central chamber 86 to the channels 102. The resulting turbulent flow in the channels 102 cools the blade skin 84 and outer surface of the core 12. The stator blade unit 80 includes a shroud segment 106 through which the mixture of liquid, now in a vaporized state, and air is emitted through discharge orifices 108 into a circumferential combustion chamber (not shown).

The phase change of the liquid coolant from its liquid state to its gaseous state provides a major part of the cooling of the blade unit of FIG. 1 or 3. The emitted air and vaporized liquid mixture discharged into the combustion chamber is raised to a sufficient temperature that the combustion in the combustion chamber is not dampened. In the case where the liquid comprises a liquid fuel, the fuel is in its ideal vaporized state for optimized combustion. While the fuel-air mixture is intentionally rich to maximize cooling and reduce the potential for ignition, it is to be understood that additional air is supplied to the combustion chamber for appropriate combustion according to the design and operating conditions of the turbine engine in which the blade units are included. The stator blade unit 80 is connected to a mounting disk (not shown) in the turbine and locked in place with the locking pins 110 shown in FIG. 3.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A gas turbine blade unit for use in a blade assembly in a gas turbine engine having a combustion chamber in which fuel and air are burned to produce combustion gases, the turbine blade assembly having internal channel means for mixing liquid and air within the blade unit for discharge as a vapor-air mixture into the combustion chamber, the blade unit comprising:

an elongated blade core with a central axis having a root with means for radially mounting the blade unit in the blade assembly of the engine, a base platform with conduit means for admitting liquid and air into the blade core to cool the core, a blade segment with a central cavity connected to the conduit means wherein admitted fuel and air are mixed, and a distal end with discharge means for discharging a liquid-air mixture from the blade unit; and, a blade skin covering at least a portion of the blade segment of the blade core forming an airfoil, wherein the core has a series of channels communicating with the discharge means between the blade skin and the core, oriented substantially parallel to the axis of the core with a channel entry in the base platform of the core in open communication with the conduit means of the base platform, and the core has further, a series of cross passages oriented transversely to the axis of the core intersecting the blade channels and the central cavity, wherein the conduit means in the base platform of the core includes liquid passage means for directing liquid at the walls of the central cavity and simultaneously at the channel entry and additionally includes air passage means for admitting air to the central cavity and to the channel entry for cooling the blade skin, and wherein for optimized cooling of the blade skin, the vaporizing liquid-air mixture directed through the series of cross passages from the central cavity to the series of channels collides with the vaporizing liquid-air mixture directed through the channel entry, and turbulently mixes with the vaporizing liquid-air mixture in the channels before centrifugal discharge of the combined vapor-air mixture through the discharge means.

2. The gas turbine blade unit of claim 1 having a shroud assembly at the distal end of the blade core wherein the discharge means comprises discharge orifices in the shroud assembly.

3. The gas turbine blade unit of claim 2 wherein the shroud assembly includes an extended portion of the blade skin.

4. The gas turbine blade unit of claim 3 wherein the shroud assembly includes cooling passages communicating with the core channels.

5. The gas turbine of claim 4 wherein cooling passages of the shroud assembly of one blade unit communicates with the cooling passages of a next adjacent shroud assembly in the adjacent blade unit.

6. The gas turbine blade unit of claim 5 wherein the blade unit has a lead side and a trailing side wherein the channels on the trailing side of the blade unit communicate with the discharge orifices on the lead side of the next adjacent blade unit.

7. The gas turbine blade unit of claim 1 having separate air chambers communicating with the central cavity and series of channels.

* * * * *